UNITED STATES PATENT OFFICE.

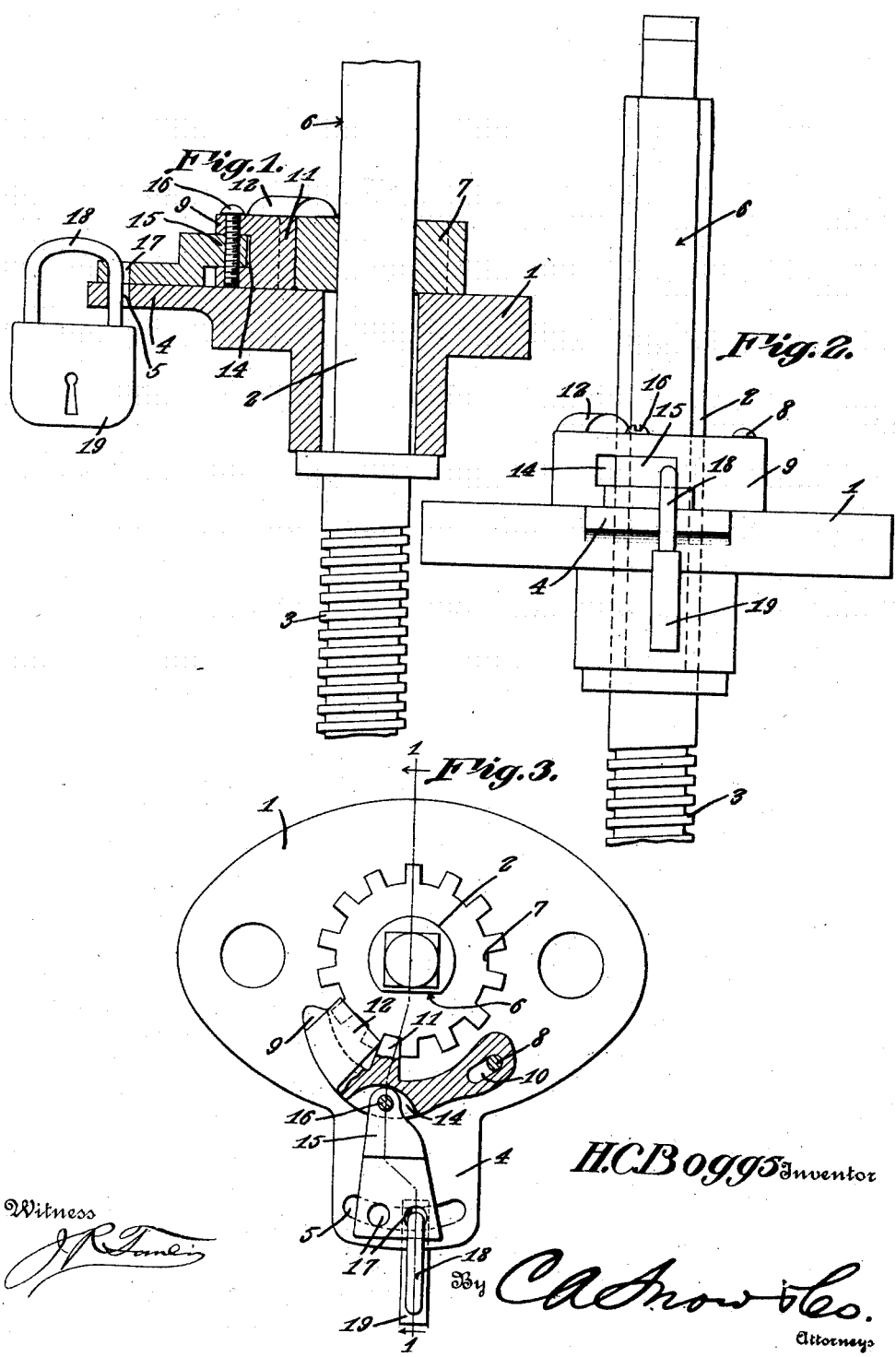

HENRY C. BOGGS, OF SHAMROCK, OKLAHOMA.

VALVE-STEM LOCK.

1,366,114.  Specification of Letters Patent.  Patented Jan. 18, 1921.

Application filed September 18, 1918. Serial No. 254,610.

*To all whom it may concern:*

Be it known that I, HENRY C. BOGGS, a citizen of the United States, residing at Shamrock, in the county of Creek and State of Oklahoma, have invented a new and useful Valve-Stem Lock, of which the following is a specification.

It is the object of this invention to provide a simple but effective means whereby a valve stem may be held against rotation by unauthorized persons.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 is a vertical section showing a device constructed in accordance with the present invention, parts being in elevation, Fig. 2 is an elevation wherein the structure is viewed at right angles to the showing of Fig. 1; and Fig. 3 is a top plan wherein parts appear in section, the line 1—1 on Fig. 3 indicating the cutting plane of Fig. 1.

The numeral 1 denotes the top of a valve casing having a laterally extended ear 4. A stem 2 is mounted to rotate in the top 1 of the valve casing. The stem 2 is threaded as shown at 3, for the operation of a valve. The stem 2 may move endwise in the top 1 of the casing, or it may merely rotate in the top of the casing, without moving endwise, depending upon the nature of the valve which is to be actuated. The stem 2 has a flat side 6. A ratchet wheel 7 is mounted on the stem 2 and rests on the top 1 of the valve casing. The construction is such that the ratchet wheel 7 will rotate with the stem 2, but, if desired, the stem 2 may move endwise in the ratchet wheel 7.

The top 1 of the valve casing is provided with a pivot element 8 received in an elongated opening 10 formed in one end of a pawl 9 having a tooth 11 adapted to engage with the ratchet wheel 7, and supplied, adjacent its free end, with a projection 12, adapted to overhang the ratchet wheel 7. In the outer edge of the pawl 9 there is a recess 14 receiving one end of an arm 15 attached to the pawl for swinging movement, by means of a pivot element 16. The arm 15 has openings 17 adapted to be alined with an elongated slot 5 of the ear 4 on the top 1 of the valve casing.

In practical operation, when the tooth 11 is out of engagement with the ratchet wheel 7, the pawl 9 being swung backwardly from the position of Fig. 3, the valve stem 2 may be rotated to operate the valve, and if the stem is of the longitudinally moving type, the stem may move longitudinally in the ratchet wheel 7. When the valve stem 2 is in the desired position, the pawl 9 is swung inwardly until the tooth 11 engages with the ratchet wheel 7. In this connection, it is to be observed that, because the pawl 9 is provided with the elongated opening 10 which receives the pivot element 8, the pawl may be shifted endwise so as to permit the tooth 11 to engage between two teeth of the ratchet wheel 7. The shackle 18 of a padlock 19 is passed through one of the openings 17 in the arm 15 and through the slot 5 of the ear 4 on the member 1 of the valve casing. The ratchet wheel 7 will now be locked against rotation, and the stem 2 will be held against rotation. Since the pawl 9 is provided with the projection 12 which overhangs the ratchet wheel 7, the ratchet wheel cannot be slid upwardly off the stem 2, when the tooth 11 is engaged with the ratchet wheel.

Having thus described the invention, what is claimed is:—

1. In a device of the class described, a valve casing; a valve stem journaled therein; a ratchet wheel on the stem; a pawl; means for connecting the pawl with the casing for pivotal movement and longitudinal movement to permit the pawl to engage between the teeth of the ratchet wheel; and means for securing the pawl releasably against outward swinging movement with respect to the ratchet wheel.

2. In a device of the class described, a valve casing; a valve stem journaled therein; a ratchet wheel on the stem; a pawl; means for connecting the pawl with the casing for pivotal movement and for longitudinal movement to permit the pawl to engage between the teeth of the ratchet wheel; and an arm pivoted to the pawl, the arm and the casing having openings adapted for the reception of a locking device.

3. In a device of the class described, a valve casing; a valve stem journaled therein; a ratchet wheel on the stem; a pawl pivoted to the casing and coacting with the ratchet wheel, the pawl having a projection overhanging the wheel to hold the wheel on the stem; and means for connecting the pawl releasably with the casing, to hold the pawl engaged with the ratchet wheel.

In testimony that I claim the foregoing as my own, I have hereto affixed my signature in the presence of two witnesses.

HENRY C. BOGGS.

Witnesses:
J. L. WILLIAMS,
E. J. LANE.